INVENTORS
NORMAN L. VAN WAGENEN
ARA NORMAN LAMPH
BY:
M. Ralph Shaffer
THEIR ATTORNEY

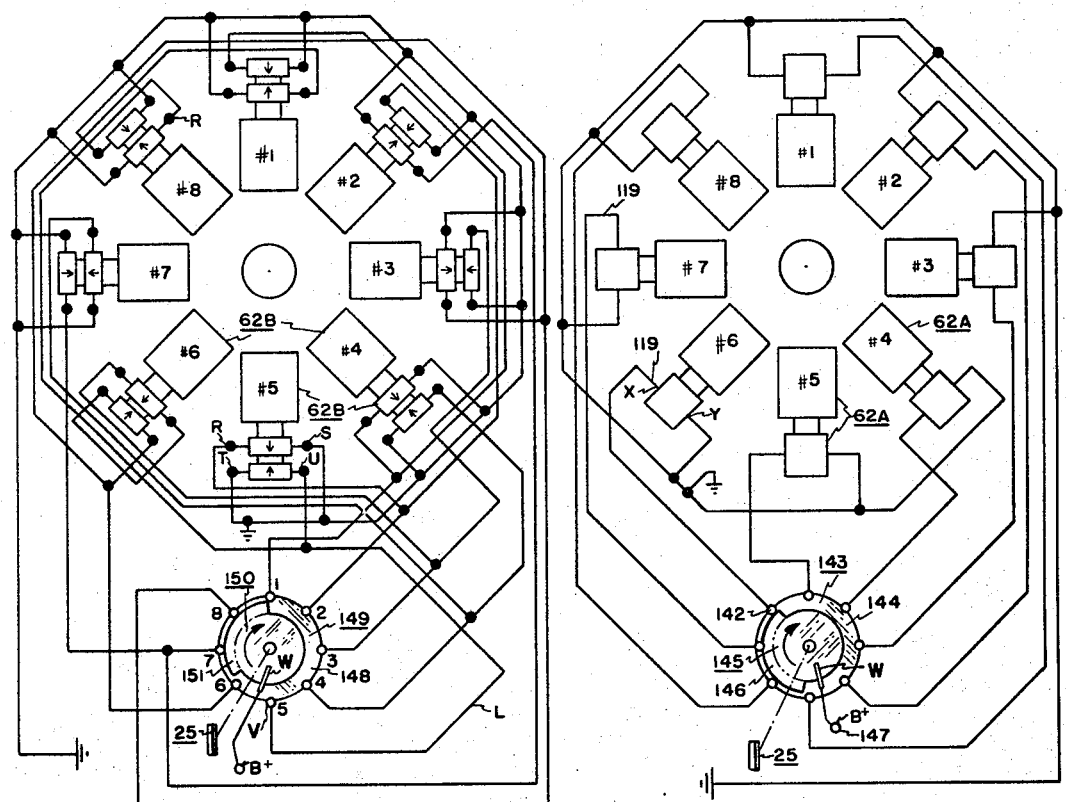
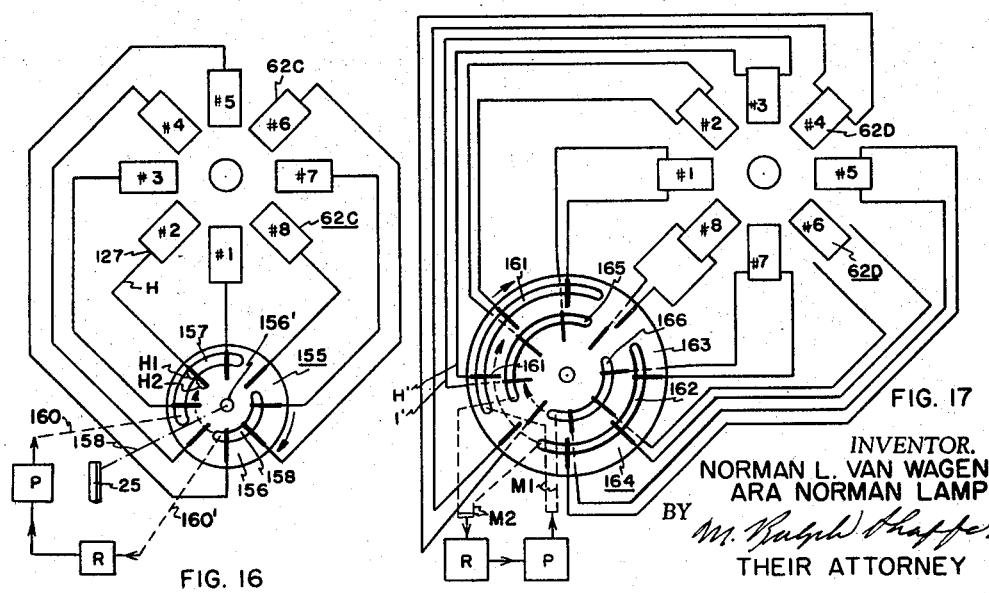

INVENTORS
NORMAN L. VAN WAGENEN
ARA NORMAN LAMPH
THEIR ATTORNEY

INVENTORS
NORMAN L. VAN WAGENEN
ARA NORMAN LAMPH
BY
M. Ralph Shaffer

THEIR ATTORNEY

INVENTORS
NORMAN L. VAN WAGENEN
ARA NORMAN LAMPH
BY
THEIR ATTORNEY

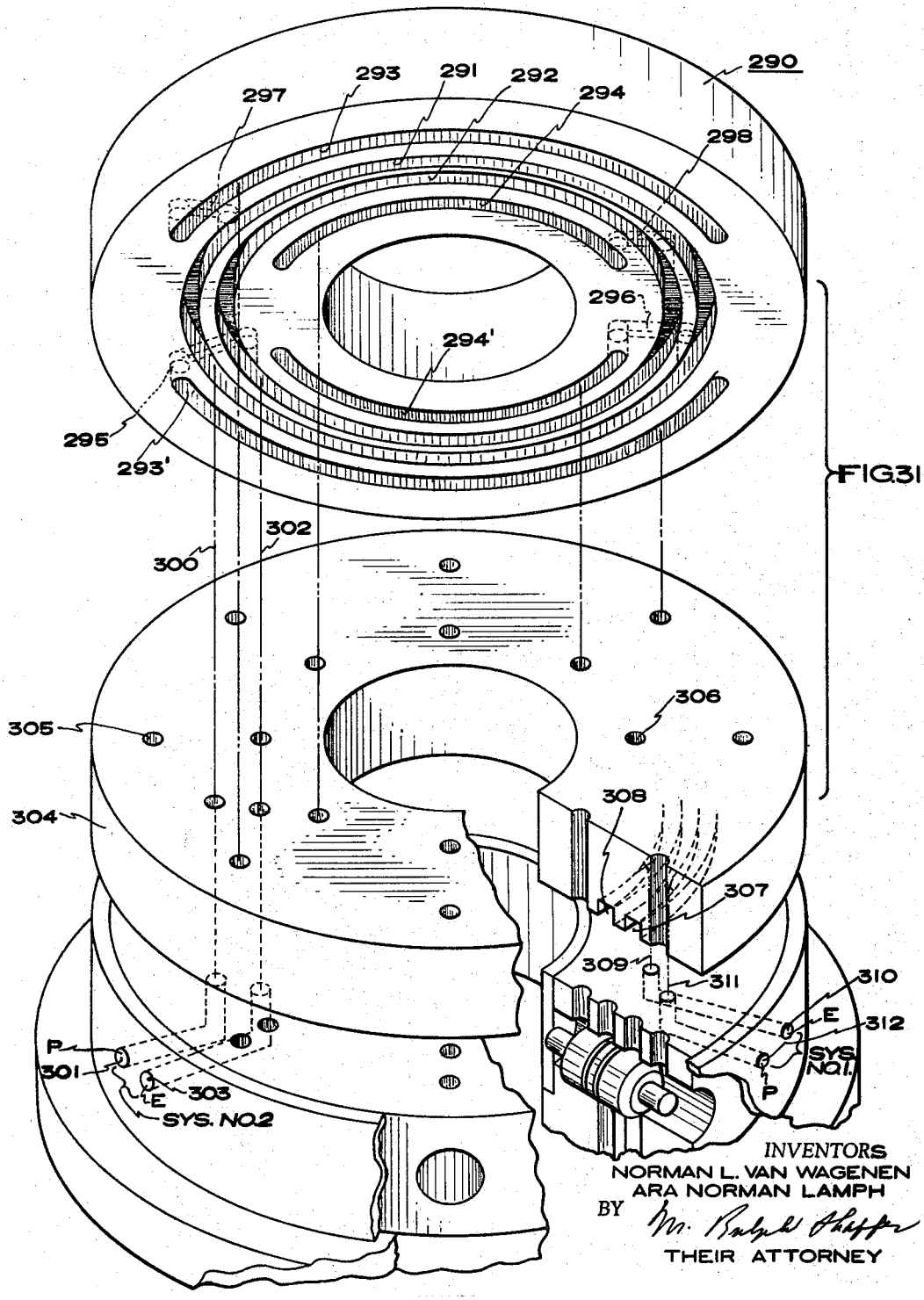

United States Patent Office 3,420,059
Patented Jan. 7, 1969

3,420,059
FLUID MOTOR TRANSMISSION AND
IMPROVEMENTS THEREIN
Norman L. Van Wagenen, 378 E. Truman Ave., Salt Lake City, Utah 84115, and Ara Norman Lamph, 540 North 200 East, Bountiful, Utah 84010
Filed Jan. 5, 1967, Ser. No. 607,428
U.S. Cl. 60—53                14 Claims
Int. Cl. F04c 1/04; F16d 31/06; F16d 33/00

ABSTRACT OF THE DISCLOSURE

The present invention comprises an improved fluid motor, systems therefor, and improvements therein. The instant disclosure and claims stress torque and pressure relief devices in the system, retaining a serially-connected reservoir in the system itself as a heat sink, a large volume fluid supply, and a source of lubrication for the fluid motor. Both input and output leading to and from the fluid motor are, preferably, positively driven by a two-stage, mutually isolated stages' gear pump.

---

The present invention relates to fluid motors and systems thereof and, more particularly, to fluid motors having, for particular purposes as hereinafter enumerated, independent valves for respective ones of the operating cylinders of said fluid motor, and to systems incorporating fluid motors such as that described, for accommodating system and environmental changes so that optimum performance is assured and the possibility of inadvertent damage to the system is reduced to a minimum.

More specifically, and relating to the subject fluid motor per se, the present invention provides in a fluid motor having a given pressure input the generation of greater torque and less friction loss at the output of the fluid motor, and this with less likelihood of leakage and seal failure than has been heretofore present in prior designs.

In the past a great number of designs for fluid motors have been developed. Those of which the inventors are aware conventionally employ a rotating disc-type, kidney-shaped, sliding valve for sequentially actuating plural operating pistons which are used to drive the output of the motor. The output generally will take the form of a wobble plate fixed to an output shaft, a crank shaft in combination with a master rod, and so forth. The problems with such fluid motors are several: firstly, seal junctures become unduly lengthy, thereby often necessitating the spring loading of the master disc valve to retain, as best as possible, the seal thereat during high-pressure operation; secondly, the sliding nature of the master valve serves to produce a friction brake effect within the motor so as to reduce measurably the output torque of the motor; thirdly, seals in general are difficult to maintain; and fourthly, the sliding-disc, friction wear of such a valve means produces abrasion products and part wear which in time may interfere with the proper operation of the system.

As to the system proper, there apparently is yet absent from current, fluid motor system designs completely satisfactory provision for adapting the system to extraneous and/or inadvertently produced forces which serve to load unduly the fluid motor output shaft, or cause it to free-wheel, and thereby chance damage and/or leakage to the equipment.

Accordingly, a principal object of the present invention is to provide in a fluid motor, multiple-valve means operatively associated with respective ones of the fluid motor drive pistons, thereby reducing the extent of the valve seal system, and thus enabling the fluid motor to operate at very high pressures and also at extremely slow speeds.

A further object of the invention is to provide in a fluid motor a nearly perfect seal within the valving means driving the operating pistons of the motor.

A further object of the invention is to provide a fluid motor exhibiting minimum friction loss, maximum output torque, and a maximum, fluid-pressure operating range.

An additional object is to provide multiple valves and multiple driving pistons in a fluid motor design, in mutual correspondence, with the valve gates of the valves operating in longitudinal movements, thereby increasing sealing effects at valve-gate junctures.

A further object of the invention is to provide control valves in a fluid motor which include valve spool extensions that can easily be operated by cam means, the latter being keyed to the output shaft of the fluid motor and/or being externally driven.

A further object of the invention is to provide in a fluid motor a valving system, whether of pneumatic, hydraulic, or electrical character, and whether operated directly or remotely, which can easily be actuated to power sequentially the pistons of the fluid motor.

A further object is to provide a radial fluid motor which is radially driven and which includes respective valving means coupled to and actuating the radially oriented cylinders of the motor.

A further object of the invention is to provide a fluid motor system wherein provision is made for excessive torque loads and/or free-wheeling of the output shaft incorporated in the fluid motor.

An additional object of the invention is to provide a balanced fluid motor drive system wherein fluid pressure return is positively driven in accordance with fluid input to the system, thereby insuring a "closed-system" effect and a balanced operation.

The features of the present invention which are believed to be novel are set forth with particularity in the appended claims. The present invention, both as to its organization and manner of operation, together with further objects and advantages thereof, may be best understood by reference to the following description, taken in connection with the accompanying drawings in which:

FIGURE 14 is a schematic diagram of a representative control valve system of the present invention wherein each of the control valves takes a form as illustrated in FIGURE 10.

FIGURE 15 is an alternate system, shown in schematic form, of the control valve system of the present invention wherein each of the control valves is of the double-winding type as shown in FIGURE 11.

FIGURE 16 illustrates in schematic form a control valve system wherein each of the control valves are hydraulically or pneumatically operated, the control valves themselves individually including respective, single-acting spools or gates in a manner as illustrated in FIGURE 12.

FIGURE 17 is a schematic representation of optional control valve system wherein each of the control valves is operated hydraulically, the individually valves themselves including valves spools which are double-acting as shown in FIGURE 13.

Figure 18:
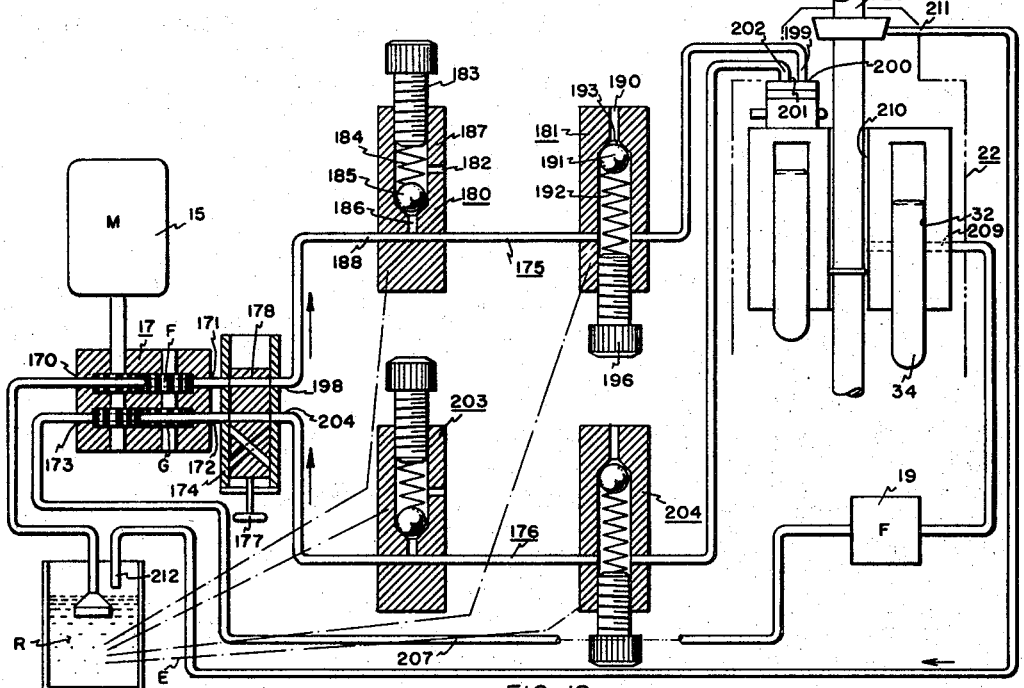
Figure 19:
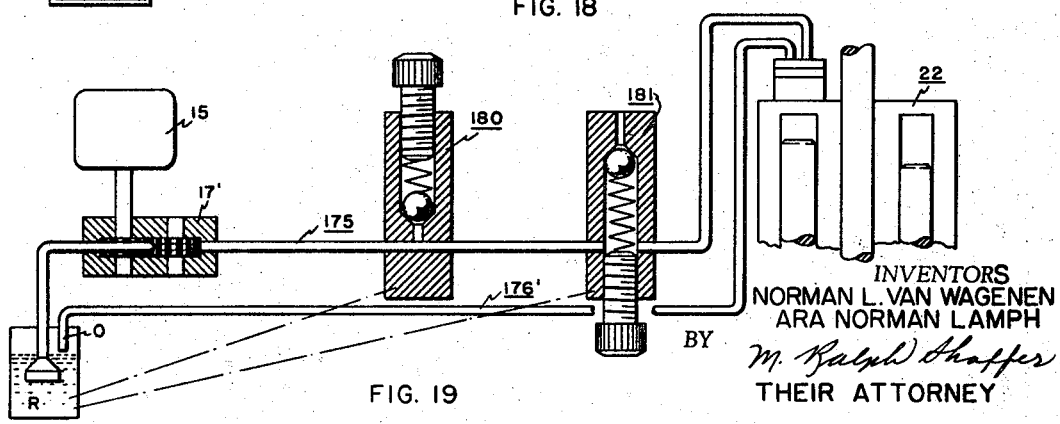
Figure 20:
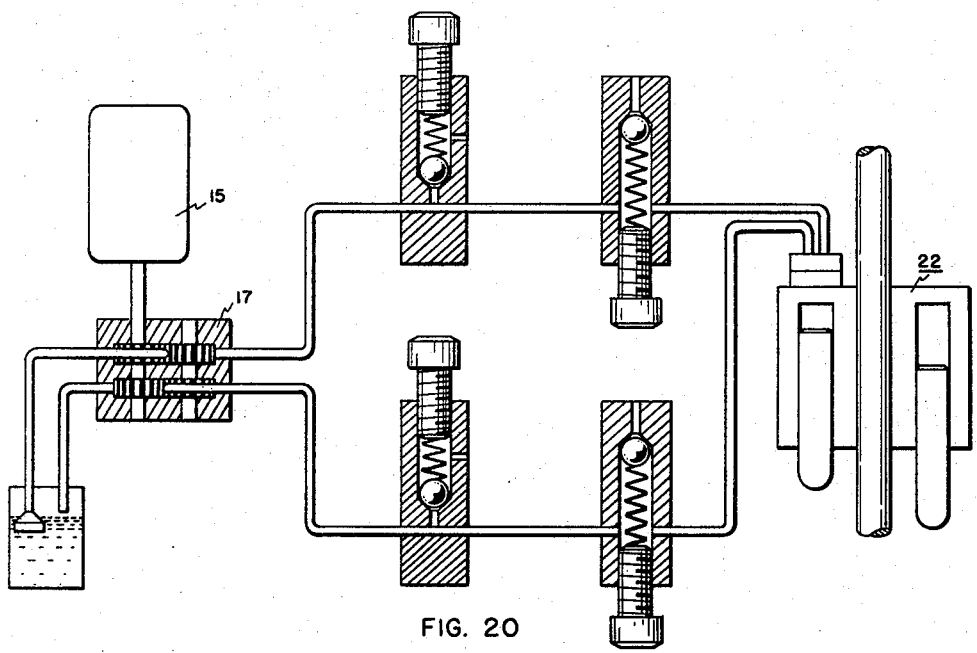

FIGURES 18, 19, and 20 are schematic representations of alternate transmission systems as contemplated by the present invention, each of said systems using substantially the same fluid motor as indicated.

Figure 21:
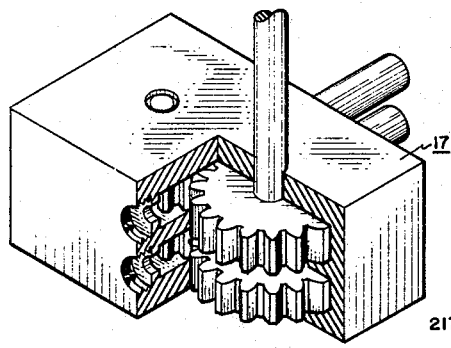

FIGURE 21 is a perspective view, partially cut-away, of the work portion of a gear pump included in each of the systems of FIGURES 18–20, to supply and simultaneously to withdraw equivalent amounts of fluid from the fluid motor portion of the system.

Figure 22:
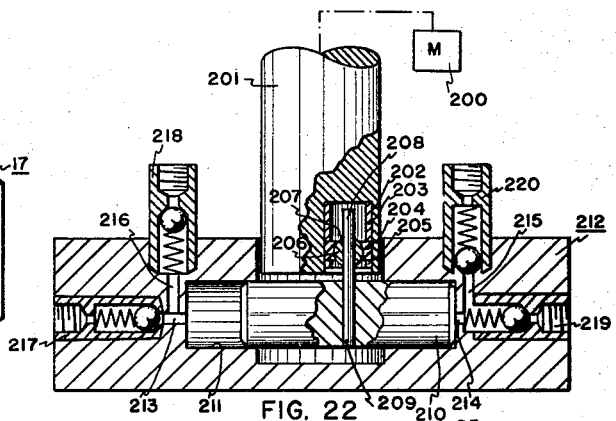

FIGURE 22 is a fragmentary view, principally in section, of a portion of a fluid pump which may be used to supply and, simultaneously, to withdraw fluid from the system supplying the fluid motor of the invention as illustrated in FIGURES 18–20.

Figure 23:
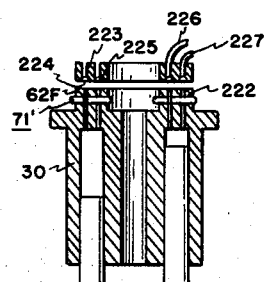
Figure 24:
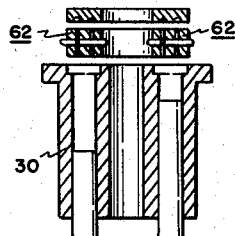
Figure 25:
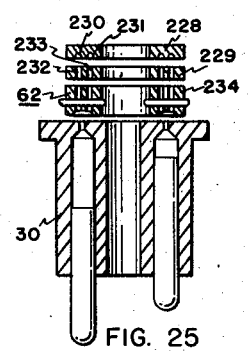

FIGURES 23–25 illustrate in simplified form alternate embodiments of the cylinder-piston valve and manifold combinations which may be used alternately in the fluid motor of the present invention, the valves being shown to be either separate from or integral with the cylinder block of the motor.

Figure 26:
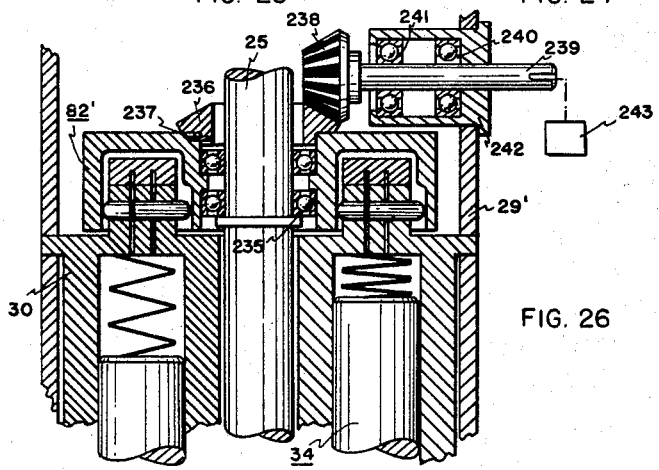

FIGURE 26 is a fragmentary view, principally in section, of the central portion of a fluid motor used in the present invention wherein a gear keyed to the cam of the fluid motor is coupled to another gear which is actuated by a separate system, shown only in block form, for controlling via the cam the sequential opening and closing of the control valves of the fluid motor.

Figure 27:
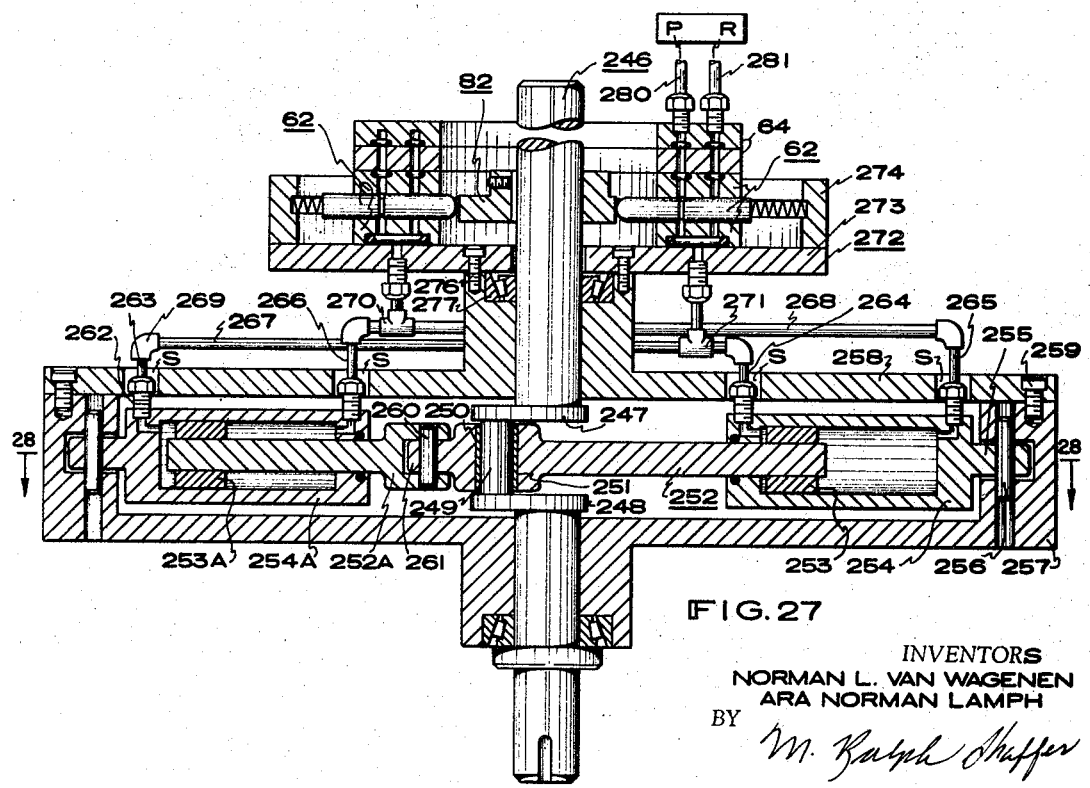

FIGURE 27 is a vertical section of a fluid motor according to the features of the present invention wherein the operating fluid driven cylinders thereof are radially oriented.

Figure 28:
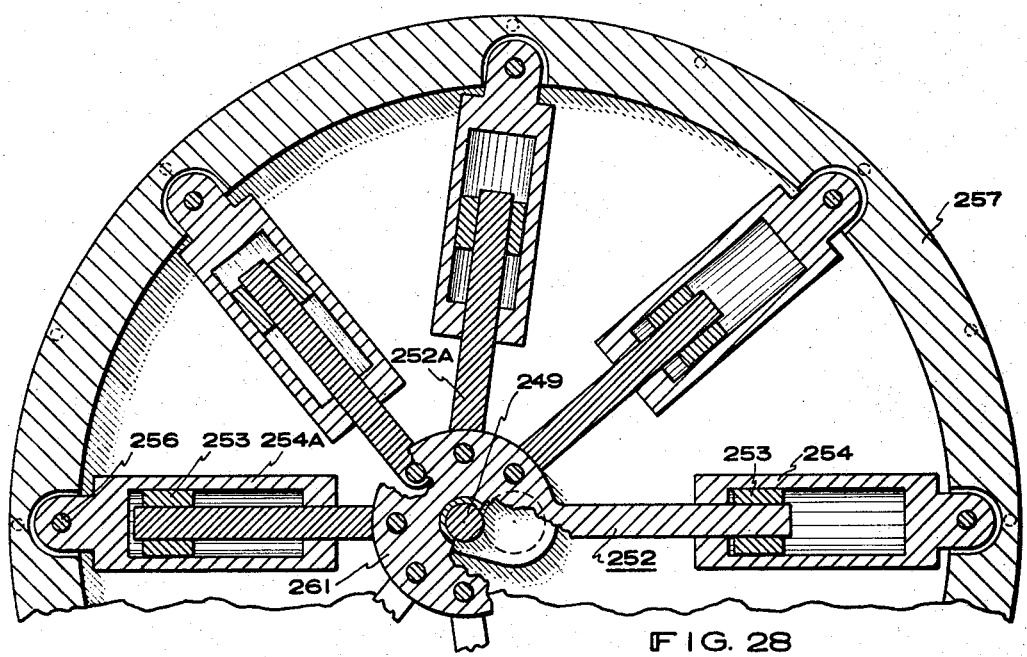

FIGURE 28 is a horizontal section taken along the line 28—28 in FIGURE 27, illustrating the co-action of a mother rod associated with piston rods of the radial-type fluid motor as made in accordance with one form of fluid motor in the invention.

Figure 29:
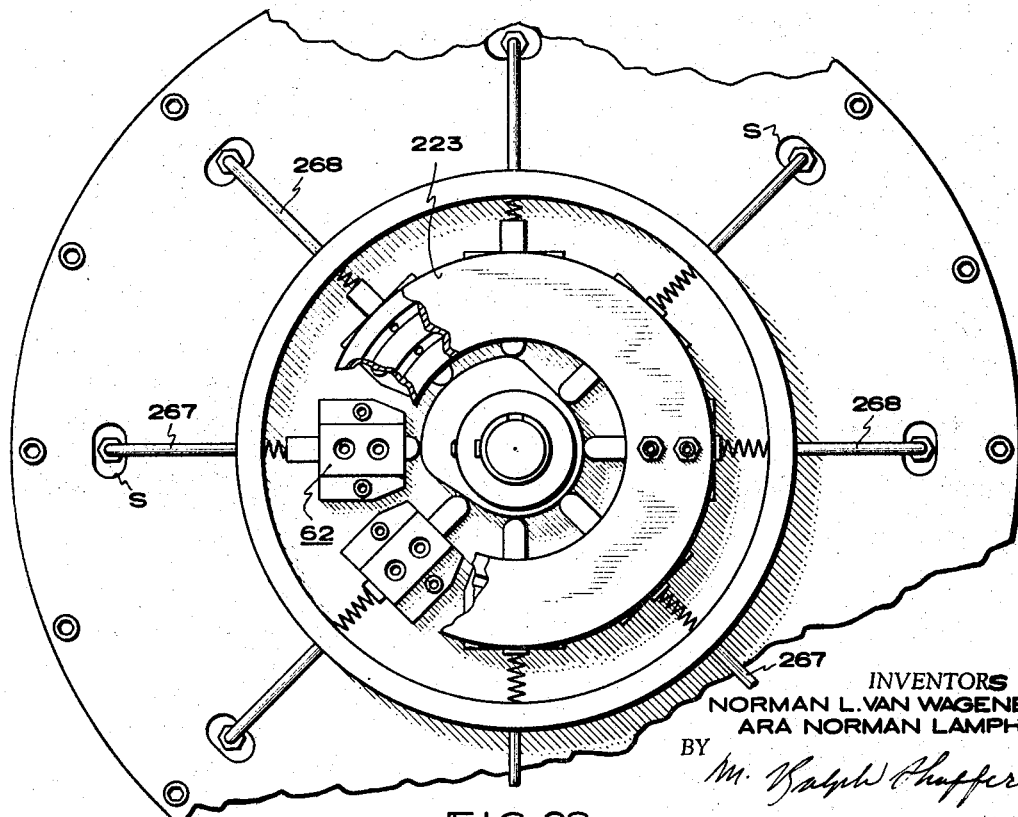

FIGURE 29 is a fragmentary plan of the valving system which may be used in conjunction with the remainder of the structure shown in FIGURES 27 and 28.

Figure 30:
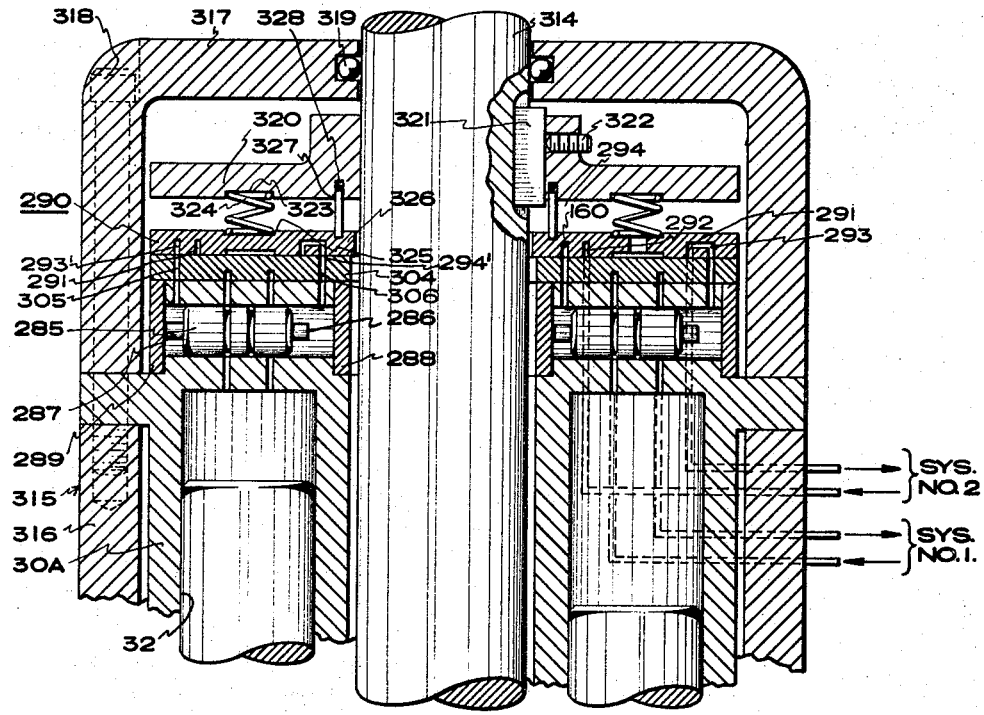

FIGURE 30 is a fragmentary vertical section of the principal portion of a fluid motor in accordance with another embodiment of the invention wherein kidney-type valving is used to actuate the several control valves succuessively for producing sequential powering of the fluid motor pistons.

FIGURE 31 is a perspective representation of the kidney valving and system operatively associated with the structure of FIGURE 30.

Figure 1:
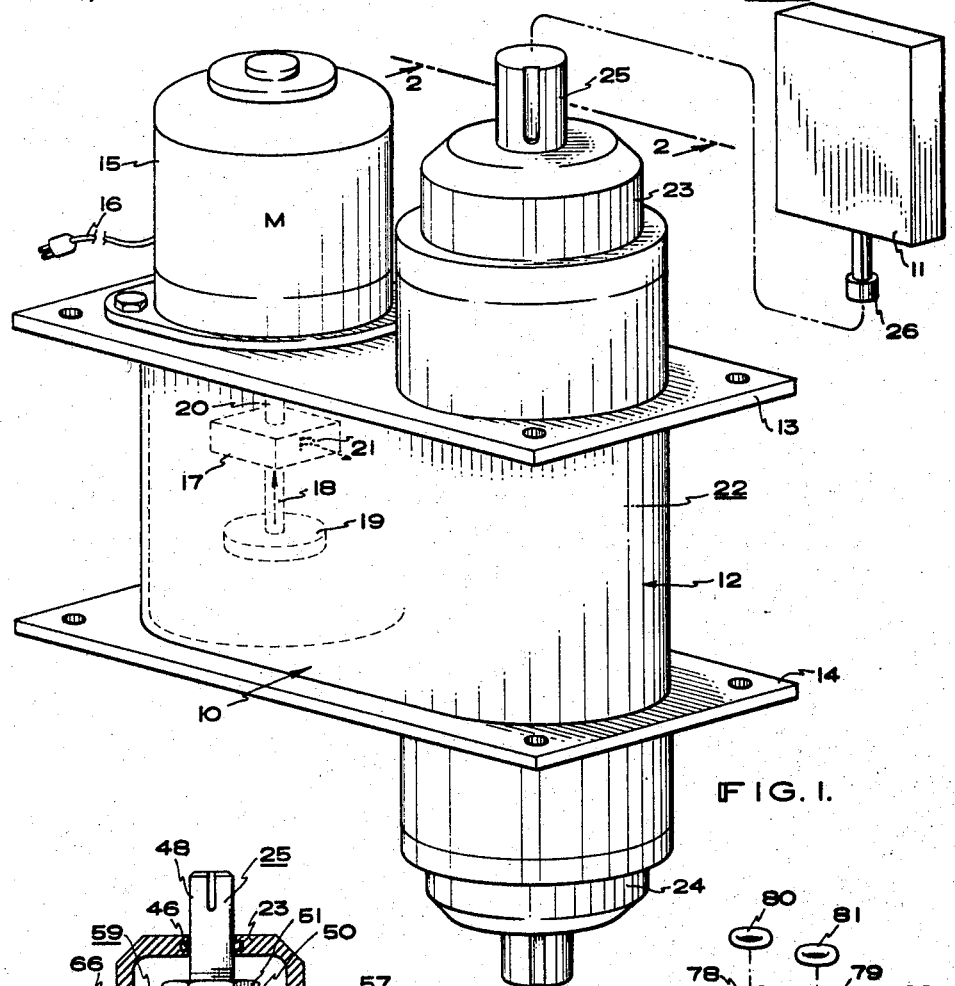
FIGURE 1 is a perspective view of a power transmission unit designed in accordance with the present invention and wherein the same comprises a turning unit for turning an external member such as a sign.

In FIGURE 1 power transmission unit 10 of the present invention may take the form of a turning unit including sign 11. However, such need not necessarily be the case. As will be understood from the discussion which follows, the invention basically takes the form of an improved, power conversion and transmission unit.

Power transmission unit 10 includes a housing 12 which is provided with a pair of mounting plates 13 and 14. Bolted to mounting plate 13 is a power drive motor 15 which may be an electric motor supplied with input electric power cord 16. Disposed within housing 12 is a fluid pump 17 (pneumatic or hydraulic) which is provided with inlet 18 and inlet screen 19. These are shown merely in schematic view for purposes of illustration. The pump 17 will be driven by shaft 20 which, itself, is driven by the power drive motor 15 in the usual manner by the latter's output shaft (not shown). The pump 17 will include a pressure side output 21 for supplying fluid under pressure to the fluid motor 22 which will be hereinafter described. The fluid motor 22 includes a pair of end-bells 23 and 24 which journal motor output shafts 25. The latter is coupled by suitable coupling 26 to sign 11 for rotating the same where this is desired.

Figures 2, 3:
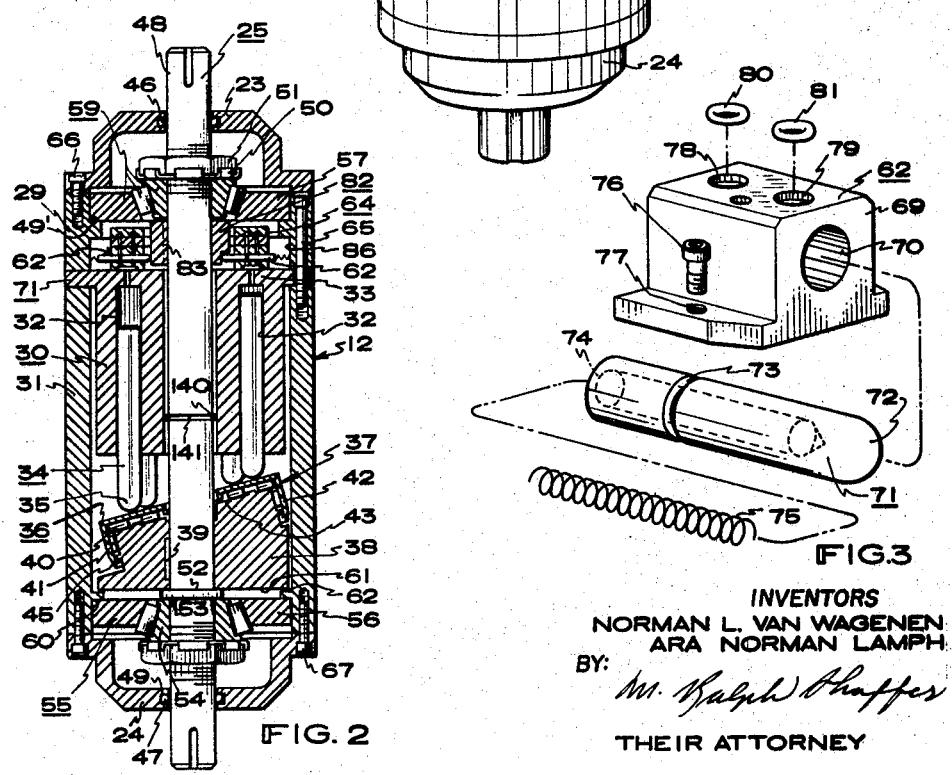
FIGURE 2 is a vertical section of the fluid motor portion of the transmission and is taken along the line 2—2 in FIGURE 1.
FIGURE 3 is an exploded view of a representative spool valve utilized in the fluid motor of the present invention.

FIGURE 2 illustrates in over-all vertical section of the fluid pump motor utilized in the invention. The composite housing 12 includes respective end-bells 23 and 24, housing spacer ring 29, and inner and outer housing members 30 and 31. The inner housing member or block 30 includes a plurality of mutually spaced cylinder bores 32, arranged concentrically about the axis of shaft 25, and respective cylinder heads 33. Disposed in each of the cylinder bores 32 is a respective drive piston 34 having a spherical lower end 35. These latter abut pressure plate 36 of the wobble plate assembly 37. Wobble plate assembly 37 includes a wobble plate base 38, keyed at 39 to output shaft 25 and having retainer protuberance 38'. A pressure plate 36 is disposed over the wobble plate base 38, as indicated, and includes a plurality of cylindrical, load bearings 40 disposed therebetween. Side or radial bearings 41 are provided between the flange ring 42 of pressure plate 36 and the upper surface 43 of wobble plate base 38. A retainer spring or keeper 44 fits into a corresponding groove 45 of the pressure plate, as illustrated in more detail in FIGURE 4. Oil seals 46 and 47 may take the form of O-rings which are seated in corresponding grooves 49. These O-rings serve the function of oil seals, as does also O-ring 140 within shaft groove 141, and may be replaced by conventional glands, if desired.

As to shaft make-up relative to its journal bearings it is seen in FIGURE 2 that a tapered journal bearing in the form of a Timken bearing 59 is seated on annular bearing shoulder 49' and is retained in place by star lock washer 50 and nut 51, the latter being threaded on output shaft 25. The shaft 25 may include upper and lower shoulders 52 and 53 which serve as abutment surfaces for wobble plate base 38 and also the inner race 54 of lower journal bearing 55. The outer races 56 and 57 of the journal bearings 55 and 59 abut the shoulders 49' and 60 as seen in the drawings. It will be understood that the lower surface 61 of wobble plate assembly 37 does not come in contact with upper surface 62 of the outer housing member 31. This is because the wobble plate structure is keyed for revolvement to the output shaft 25 by key 39 and rotates in accordance with rotation of the latter.

As to the cylinder block or inner housing 30, the same is shown to be provided with a plurality of parallel, mutually spaced cylinder bores 32 arranged in a ring concentric with the axis of output shaft 25, and a plurality of control valves 62 respectively fixedly disposed with respect to said cylinder bores and which are detailed individually in FIGURE 3. Disposed above and communicating with the control valves is a manifold 64 the details of which will be shown hereinafter. Bolts 65 and 66 make up the assembled housing structure in the manner indicated. Bolts 67 secured the lower end-bell to the outer housing.

More will be explained as to the operation of the fluid motor of FIGURE 2 in connection with the discussion of FIGURE 4 which follows. At the present point it is deemed advisable to discuss the structure of individual control valves. Representative control valve 62 of FIGURES 2 and 3 is shown to include a valve body 69, the same including a spool or shuttle bore 70. Bore 70 receives valve gate 71 the inner end of which comprises a cam-actuated portion 72. Valve gate 71 includes valve gate passageway 73 which preferably is annular, circumscribing the valve gate in the manner indicated. A central bore 74 is provided in the valve gate and receives spring 75. Valve body 69 includes a plurality of Allen screws 76 which cooperate with mounting apertures 77 (one being shown) to mount the valve body 69 to the inner housing or block 30. It is seen that the valve body includes exhaust aperture 78 and intake aperture 79. Both are provided with a sealing O-ring 80 and 81. It will be seen hereinafter that the cam actuated portion 72 of valve gate 71 is in a permanent thrusting engagement with cam 82 of FIGURE 2, the latter being mounted upon and keyed to shaft 25 by means of key 83. The individual valve gates 71 are suitably spring-biased by the individual compression springs 75 the outer ends of which engage the inner surface 86 of housing spacer ring 29. Thus, it will be seen that as the cam 82 revolves in accordance with the rotation of output shaft 25, the same will successively and progressively actuate the valve gates 71 so as to accomplish a certain flow pattern which will be described hereinafter.

Figure 4:
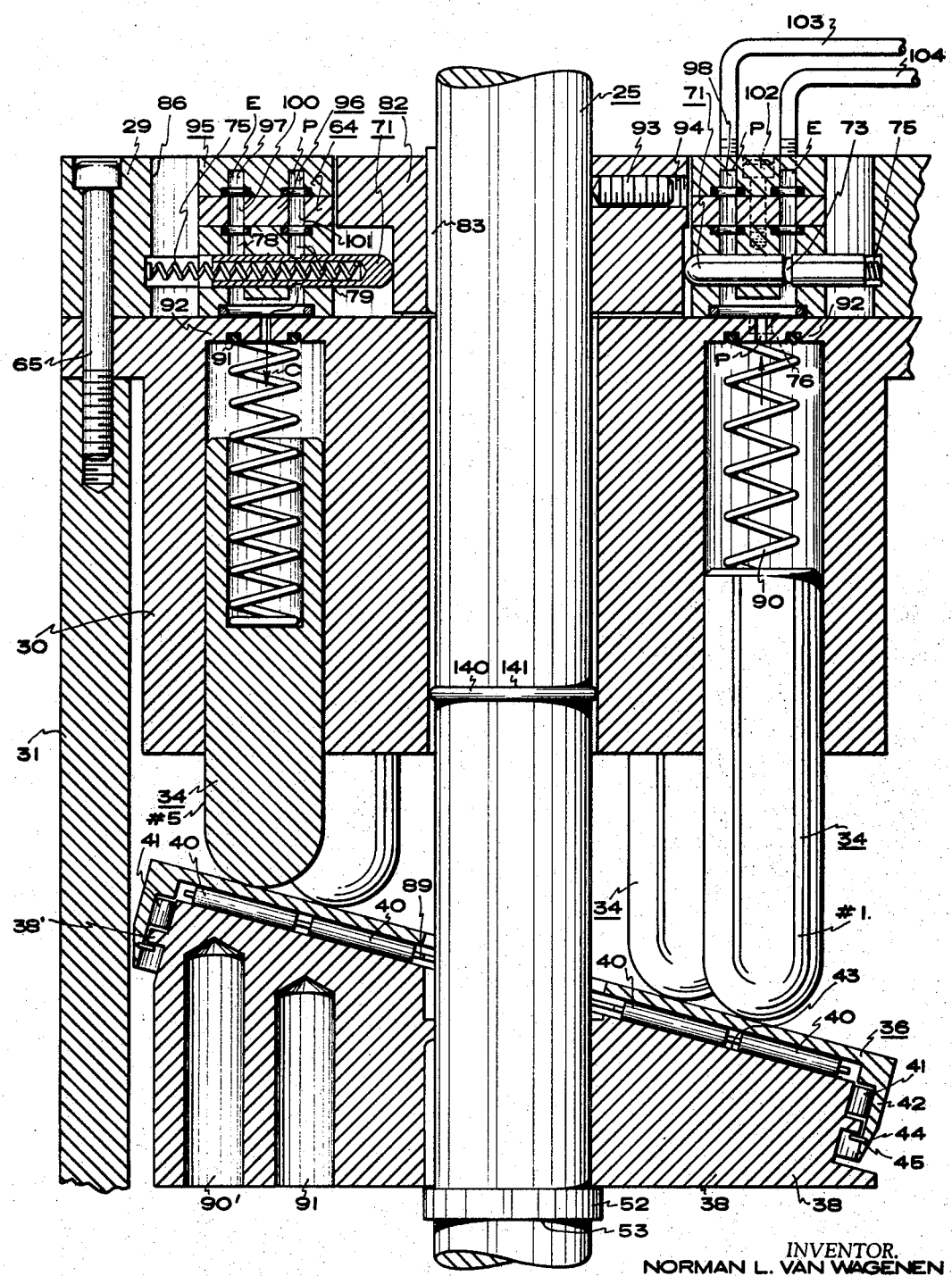
FIGURE 4 is an enlarged, fragmentary section of a central portion of the fluid motor shown in FIGURE 2.

FIGURE 4 illustrates the several cylindrical load bearings 40 as being retained in a bearing keeper 89. Wobble plate base 38 may include plural lightening holes 90' and 91 for balancing the structure with respect to output shaft 25. Springs 90 may serve as compression springs for the pistons 34 and may be seated in annular grooves 91 of the individual cylinder heads 92. FIGURE 4 also illustrates that the cam 82, keyed to shaft 25 by means of key 83, may be positioned in its chosen place by set screw 93, the latter being disposed within threaded bore 94 of the cam 82.

FIGURE 4 illustrates the manifold 64 as comprising a pair of rings 95 and 96, the former including annular manifold grooves 97, 98 and the latter including a circular pattern of holes 100 and 101. The latter apertures communicate with apertures 78 and 79, see also FIGURE 3, of the valve body 69. The manifold ring structure may be secured in place to the valves by a plurality of bolts 102, one being shown. Inlet conduit 103 and outlet conduit 104 may be coupled to the pressure and exhaust manifold fittings P and E, respectively, as shown, in FIGURE 4. The valve bodies 69 themselves may be secured in place to the inner housing or block 30 by means of Allen screws 76, see FIGURES 3 and 4. For most units the compression springs 90 will be utilized. It is possible, of course, for the spring to be deleted where the unit is to stand in upright position so that gravity is effective to urge continuously the lower extremities of the power pistons 34 against the upper surface of pressure plate 36 of the wobble plate assembly.

FIGURE 4 illustrates that the exhaust port at E is open relative to right-hand piston 34, and hydraulic fluid (or air under pressure) has been caused to proceed from the cylinder cavity shown on the right-hand side of the drawing upwardly through valve gate passageway 73 and through exhaust port E of the manifold to proceed out through conduit 104. At the time this is occurring the inlet or pressure port 96 and the alignment of valve gate passageway 73 of the left-hand side of the drawing will permit fluid to enter along path C into the cylinder chamber on the left-hand side of FIGURE 4. This serves to thrust downwardly upon piston 34 so that the latter will advance the wobble plate assembly 37. Successive actuation of the pistons 34 through successive actuation of the control valves 62 in the manner indicated produces the revolvement of the wobble plate structure and the output shaft 25 keyed thereto.

Figure 5:
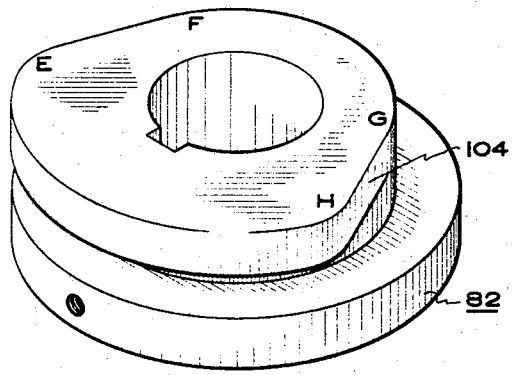
FIGURES 5 and 6 are perspective views of representative cams which are used, alternately, in a fluid motor design practicing the essential features of the invention.

FIGURE 5 illustrates one type of cam 82 which may be utilized in practicing the invention. The cam will be mounted upon an output shaft 25 as illustrated in FIGURES 2 and 4. The shape of the cam lobe 104 will be such that, that in one form of the invention, four of the ten radial valves used will be open on the pressure side, the opposite valves (four) will be opened on the exhaust side, and the two remaining valves will be in a transition condition. FIGURE 5 illustrates a basic principle of the invention wherein it will be seen that the valves having valve gates 71 co-acting with the cam lobe 104 at region F–G will be in their cylinder intake or pressure condition, so as to supply pressured hydraulic fluid to the pistons 34 within cylinders 32. Correspondingly, the cam lobe at H–E is enlarged so as to position the valves gates of the valves co-acting with the cam at this portion inwardly, thus, creating a condition of exhaust with respect to each of these valves. Accordingly, the fluid is caused to exhaust from the associated cylinders, and the pistons thereat will raise. The areas of travel E–F and G–H are transition areas wherein the valve of FIGURE 3 will be traversing from an open pressure port condition to an open exhaust port condition (GH).

Figure 6:
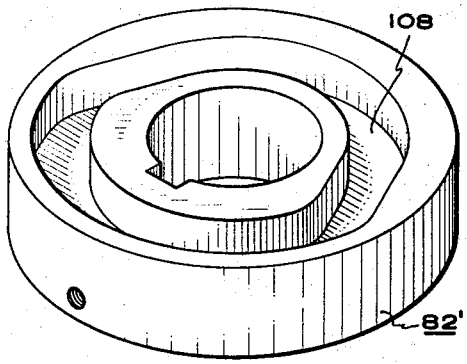
Figure 7:
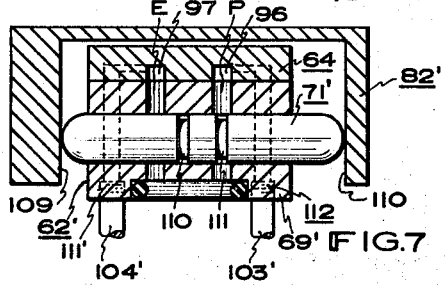
FIGURE 7 is a fragmentary section view of a double-acting spool valve which may be used with the cam of FIGURE 6 in the subject fluid motor design.

FIGURE 6 illustrates a slightly different type of cam 82' wherein a cam track 108 is supplied. In this event the valve 62 is slightly modified to the structural condition shown at 62' in FIGURE 7 wherein the valve spool or valve gate 71', corresponding to valve gate 71 in FIGURE 3 is double-ended. The opposite, spherically contoured ends of the valve gate 71' cooperate with the opposite sides 109 and 110 of the cam track 108 so that the distance deviations of the center of the track from the central axis of the cam will cause a movement to the right or to the left of the valve gate 71' relative to valve body 69'. In the case of the embodiment of FIGURE 7, it will be seen that the circumferential groove passageways 110 and 111 of a valve gate selectively co-act with their respective pressure and exhaust ports P and E of the new valve body 69' (corresponding to valve body 69 in FIGURE 3). In FIGURE 7 it will be noted that the manifold structure 64 is basically the same as that illustrated in FIGURE 2. At this time, however, the conduits 103', 104' (corresponding to conduits 103 and 104 in FIGURE 4) and valve body 69' are mutually constructed and arranged for communication of the former with annular manifold grooves 96, and 97. Passageways 110 and 111 respectively communicate therewith, selectively, via pressure and exhaust ports P and E.

Figure 8:
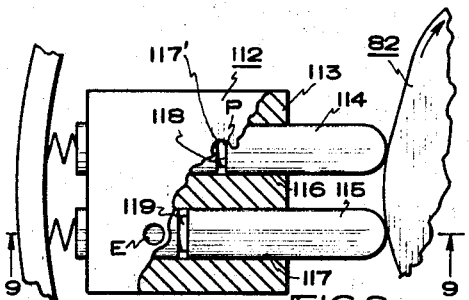
FIGURE 8 is a fragmentary view, partially in section, of a two-spool control valve which is actuated by the cam in FIGURE 5 in opening and closing, alternately, the intake and exhaust orifices of the valve.
Figure 9:
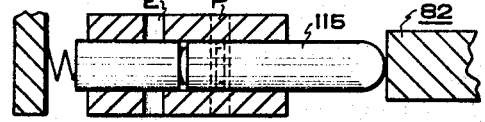
FIGURE 9 is a transverse, vertical section taken along the line 9—9 in FIGURE 8.

A slightly modified valve is indicated in FIGURES 8 and 9 of the drawings. Valve 112 includes a valve body 113 and a pair of valve gates 114 and 115 operating in shuttle bores 116 and 117. Each of the valve gates 114 and 115 include peripheral passageway grooves 118 and 119. Thus, the invention shows the operation of the cam and valves when two valve gates per valve are used, for opening and closing independently the pressure and exhaust ports, respectively. Thus, FIGURE 9 illustrates the condition of valve body 115 in FIGURE 8 wherein the same has changed from, say, its exhaust condition so that the pressure port is conducting through the valve to the associated cylinder. It will be noted in FIGURE 8 that as the cam proceeds in a clockwise direction the valve gate 114 will gradually progress to the left, so that the communication through passageway 117' of valve gate 114 will be interrupted, to remove the pressure port P (117) from communication through passageway 118 to the opposite aperture in the valve to the corresponding cylinder. Correspondingly, this action is accompanied by an alignment of exhaust port E with gate passageway 119, allowing exhaust through the valve at this point.

It will be understood that while there are many types of valves which conceivably can be employed, the ones shown are eminently preferred as friction drag and chances of possible leakage are reduced to a minimum.

Figure 10:
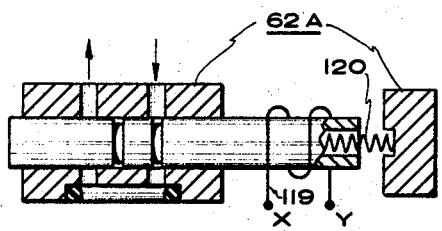
FIGURES 10 and 11 are section views, principally in schematic form, of single-winding and double-winding of solenoid control valves, respectively, which may be electrically activated for accomplishing the intake and exhaust functions hereinafter described.

FIGURES 10–13 illustrate valves substantially identical to that illustrated in FIGURE 7, with the exception that the control valves at this time are operated by means other than by direct actuation through a cam. Thus, FIGURE 10 presents a single winding solenoid valve having a single winding 119 and a return spring 120. Rather than the return spring 120, the control valve may include a double-winding solenoid valve 121 including plural solenoid windings 122 and 123. One of the windings will be energized at substantially all times, with each being energized alternately in accordance with the flow conditions desired through the valve. The solenoid windings may be electrically actuated in a manner hereinafter described.

Figure 12:
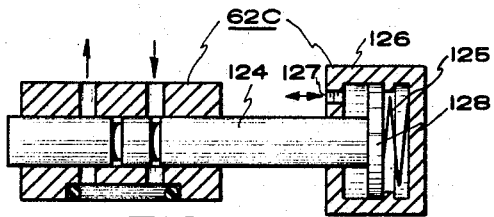
FIGURES 12 and 13 are section views, principally in schematic form, and illustrate optionally-used control valves, either pneumatically or hydraulically operated, of the single-acting shuttle and double-acting shuttle types.
Figure 13:
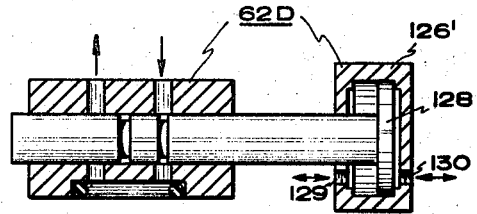

FIGURES 12 and 13 illustrate hydraulically or pneumatically operated valves which correspond to those shown in FIGURE 10. Thus, the valve gate 124 may include a pressure return spring 125 and be actuated hydraulically or pneumatically through a cylinder 126 having inlet port 127. The valve gate piston 128 contained theerin is a single acting piston, as indicated. The spring 125 may be deleted, of course, and the piston 128 may be designed as a double-acting piston contained within cylinder 126', the latter having alternating pressure and exhaust ports 129 and 130. The arrows show the various directions of flow for the various valve conditions indicated, this in conjunction with the valve actuating means, whether of electrical, pneumatic, or hydraulic character. The systems including these valves will be described hereinafter. Of course, it will be understood that there are a number of different types of cam arrangements which might equally be used in practicing the invention. For example, the inner cam surface of cam 82' in FIGURE 6 might be deleted and the spring simply caused to abut a central portion, with the valve gates being re-oriented 180° so they contact an outer camming surface within the interior of the cam.

For convenience the control valve 62 in the drawing shall be referred to as 62A–62D in FIGURES 10–13, respectively.

Figure 11:
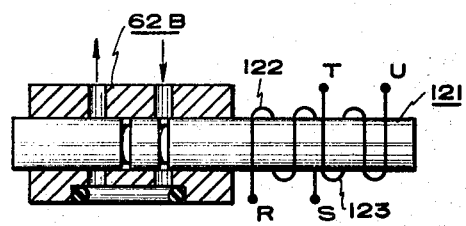

For the electrically operated, solenoid control valves in FIGURES 10 and 11 the electrical systems shown in FIGURES 14 and 15, respectively, will apply. The system of FIGURE 14 incorporates a plurality of control valves 62A as illustrated schematically in FIGURE 10. Terminal X of each of the valves 62A is connected to a respective contact 142 of rotary switch 143. This may be a wafer switch including an insulative base 144 and a rotating, center conductive portion 145 including arcuate contactor segment 146. The contacts 142 will be respectively fixedly mounted to the base 144 in the conventional manner. All rotating switch members, e.g. member 145, remotely disposed or otherwise, will be pivoted to base 144 and keyed through gear, shaft, or other means to output shaft 25 or to some other driving means. The arcuate contactor at 146 is preferably designed to be of sufficient extent that three of the contacts 142 (of the light valve system) will be contacted at any one time. The contacting by the arcuate segment 146 with any of the contacts 142 will connect terminals X through conductive portion 145 to a source of, e.g. B+ potential at 147 through conductive wiper W. All of the terminals Y are maintained at a common reference (ground) potential. Thus, three of the solenoid valves 62A will be energized to "on" or pressure condition at any one time, whereas the remainder of the valves will remain unenergized. This, accordingly, produces a pressurization of the pistons 34, see FIGURE 4, to engage the wobble plate assembly at its upper regions and thus to tend to rotate the latter about the axis of output shaft 25. As the switch 143 continues to rotate via conductive portion 145, the number of solenoid control valves 143 energized, though remaining equivalent, will nonetheless constitute a different and progressive set of control valves so that an effective circular pressurization of the wobble plate structure will be effected, through these several pistons 34 when pressured as previously indicated through the selective actuation of valves 62A. Where the valves 62A are not energized, then they will be in their exhaust condition.

Valves 62B in FIGURE 15 individually correspond to the valve 62B illustrated in FIGURE 11. This type of valve is a double-acting solenoid valve having a pair of windings provided with respect to terminals R, S, T, and U.

FIGURE 15 represents schematically a system incorporating the control valve 62B of FIGURE 11. Terminals T of each of the control valves are retained at a ground or common reference potential, as are also terminals S. Terminals U are electrically coupled by respective leads L to their respective contacts as indicated in FIGURE 15. These contacts, labeled generically as V, are mounted to the insulative base 148 of rotating wafer switch 149. The latter includes a central, rotating, conductive member 150 having a contact wiping conductor segment 151. The latter contacts a group of three of the contacts (numbers 7, 8, and 1 being shown in FIGURE 15) and, during its travel, contacts a progressing set of three contacts as the switch rotates. Ground potential is maintained at the circuit points indicated.

It is noted that representative terminal U of lowermost relay 62B is connected not only to contact member 5 on the wafer switch but also to terminal R of the relay 162B at #8 position. Thus, when the solenoid winding associated with terminal U of the lowermost relay 62B is energized, through the movement of the wafer switch to contact the contact V at #5 position on the switch, then the opposite winding associated with the relay 62B at #8 position is electrically actuated to be disposed in the opposite condition. Thus, a single switch may accommodate both the energization of one set of relays into pressure condition while simultaneously energizing in the opposite direction three of the remaining control valves to discharge condition. The rotating center of the switch shown is keyed by gear shaft pin or other means to the output shaft 25 of the fluid motor. Thus, the rotation of the output shaft of the fluid motor simultaneously accomplishes a rotation of the central conductive portion of switch 149. This, in turn, produces a selective actuation of a set of three control valves 62B and an exhaust of three opposite control valves, so that the fluid motor continues to function in the manner indicated. The central portion of the switch is, of course, maintained at a B+ or other potential relative to the common reference potential indicated. Obviously alternating current solenoids and alternating current electrical sources may be used equally as well.

FIGURES 16 and 17 show hydraulic or pneumatic systems which may be employed equally as well to accomplish a progressive actuation of the control valves for selectively and sequentially pressuring the pistons of the fluid motor. In FIGURE 16 the pump P and reservoir R are connected together as indicated schematically and are related to the several hydraulic or pneumatic lines H, in one embodiment of the invention, through a kidney-type valving means 155. For convenience of illustration only the rotating portion 156 of the kidney valve is illustrated. It will be understood that the same includes kidney-shaped openings 157 and 158, as illustrated. The portion 156' of member 156 may be keyed by gear or other means to the output shaft 25 of the fluid motor. This means is indicated schematically as 158. Solenoid valves 62C each include at their ports 127 a suitable connection (not shown) for a respective line H. The same will be understood to be in communicative relationship at areas H1 and H2 with such kidney porting as may pass thereover. The drawings illustrate the control valves 62C at positions #1, 2, and 3, which are in communicative relationship with the port opening 157. The latter is coupled by suitable manifold means 160 to pump P of the over-all transmission unit. Accordingly, the pump P will supply pressured fluid to the control valves for orienting the control valves into a pressured condition so that the latter may supply pressured fluid to the pistons of the fluid motor as aforementioned. In a corresponding manner, the three opposite control valves will be exhausted of their control fluid through kidney porting 158 and manifold 160' so that such fluid will be directed back to reservoir R. It is noted that a different set of three control valves will be supplied pressure fluid and, alternately, exhausted, as the kidney valve porting member 156 continues in its keyed rotation with its output shaft 145. Accordingly, there is provided a means, through the rotation of output shaft 25, itself, for porting the spring-loaded control valves 62C so that progressive sets of three are opened for pressuring the pistons of the fluid motor and, alternately, closed for returning the fluid within the fluid motor cylinders to the reservoir of the system.

FIGURE 17 is substantially identical in operation to the system of FIGURE 16. The control valves this time take the form of valve 62D wherein the spools thereof are double-acting as illustrated in FIGURE 13. It is noted in FIGURE 17 that the hydraulic leads H' and I' of the several valves communicate with kidney ports 161 and 162 of rotating kidney valve plate 163, of the composite kidney valve 164, the remainder of the parts of which are not illustrated for clarity of present illustration. Ports 165 and 166 are also included and assume selective conductivity with conduit I' of the several control valves 62D. It will be understood that the extremities of the lines representing conduit H' and I' will become in conduction condition with any kidney port passing thereover. Thus, the control valves in the lower-left hand quadrant of the drawing are so disposed relative to the porting of kidney valve 164 that the H' conduit supplies pressured fluid to the control valves, to urge the latter into a condition such that pressure fluid is passed therethrough to pressure the pistons within the several cylinders of the fluid motor. The fluid on the other side of the control valve cavities is returned through conduit I' and through kidney porting 165 to the reservoir R of the system. As the kidney porting valve plate 163 continues its rotation, there will be a progressive and different set of three control valves energized for pressuring three of the fluid motor pistons, whereas the opposite three pistons will be able to exhaust through their effective control valves by virtue of the fluid of the auxiliary or driving system of the control valves being exhausted through porting 162 to the reservoir R.

It is noted in FIGURE 17 that for the opposite sets of three control valves, i.e. disposed oppositely to each other, the first set of three is pressured as to one side and exhausted as to the remaining side, whereas the reverse condition is present with respect to the remaining set of control valves. This valve condition progressively "rotates" in accordance with the rotation of the kidney-type valve disc 163. A suitably grooved or slotted manifold M1 and M2 (see FIGURE 31) as appropriate for slide-type kidney valves, intercouple the porting of the kidney valve with the pump and reservoir in the manner schematically illustrated.

FIGURE 18 an embodiment of the complete transmission including the fluid motor is shown. The power means or motor 15 supplies power by its output shaft as shown to fluid pump means 17. The latter preferably takes the form of the conventional, two-stage gear pump as illustrated in FIGURE 21. The design of gear pumps is well known in the art. The pump means includes input orifice 170 and output orifice 171. A second input orifice is disposed at 172 and a second output orifice is disposed at 173 of the second stage of the pump. For convenience of illustration the stages shall be referred to as gear pump stages F and G. There is preferably included a four-way reversing valve 174 which is connected as indicated in the fluid drive circuit 175 and the fluid return circuit 176 of the system. It is noted that by means of a handle 177 the valve 174 can be reversed from its forward condition, as shown, to a reverse flow condition, by the valve spool 178 being moved upwardly such that the crossed (but spaced) orifices are disposed in registry with the inlet and outlet orifices of the four-way valve 174. Disposed in the fluid drive circuit 175 is a pressure-relief check valve 180 and also a torque-relief check valve 181. The former includes outlet 182 and an adjustment screw 183 which serves as a reaction member for biasing spring 184. The spring keeps the ball 185 against its seat 186. The ball is the same size as the valve bore 187 and, when excessive pressure exists in the line 188, as when the fluid motor inadvertently ceases to rotate, the ball is urged upwardly such that fluid can proceed through outlet 182 to reservoir R. At this point it will be understood that in one form of the invention the entire system is emersed in oil of the reservoir, for example, such that the outlets with the valves communicate immediately with the enclosed case or reservoir R of the system.

The torque-relief check valve 181 likewise includes an inlet 190 and a ball 191 which is spring-biased via spring 192 against seat 193. This ball will be of a diameter less than the diameter of the valve bore so that once the ball is urged, down through reduced pressure in the fluid drive circuit 175 relative to fluid in the reservoir, then there will be a communication from the reservoir R through inlet 190 into the fluid drive line. Adjustment screw 196 is provided to adjust the spring bias upon the ball check 191. The pressure relief valve 180, in sum, protects against excessive pressures existing in the fluid drive circuit. The system is also protected should the fluid motor commence to "free-wheel" either in a clockwise or a counter-clockwise direction. Free-wheeling may be due to external torque being supplied in either direction to the sign 11 carried by output shaft 25, as such may cause a reduced pressure area in the fluid drive circuit 175. In such event the ball check will be relieved from its seat within the torque-relief check valve 181 and fluid will commence to proceed through inlet 190 into the valve and system proper.

Fluid drive circuit 175 includes input 198 and also output 199, the latter leading into the manifold of the fluid motor which has previously been described. A port leading into the manifold shall be referred to as the motor fluid input 200. The fluid motor, of course, has also a motor fluid output 201 directly connected to the inlet 202 of fluid return circuit 176. The latter includes a pressure-relief check valve 203 and also a torque-relief check valve 204 constructed in the same manner and operated in the same fashion as pressure relief check valve 180 and torque relief check valve 181 in the fluid drive circuit. The outlet 204 of fluid return circuit 176 is connected through the optionally included four-way reversing valve to the inlet 172 of the second stage of the gear pump. The outlet 173 is coupled by a hydraulic or pneumatic line 207 through filter or screen 19 and through the fluid motor at cylinder block bypass passageway 209 to the bore 210 accommodating the rotation of output shaft 25. This bore is preferably filled with lubricating oil which proceeds to the top of the motor and then proceeds outwardly through conduit 211 to a terminal point 212 in communication with reservoir R.

It will be understood that instead of having independent conduit, suitable apertures and passageways within the various housings of the structure may be used to accommodate forward and return fluid flow. The fluid of course may be either liquid or gaseous in nature, and the pump either a liquid pump or a compressor, for example.

In operation, the powering of the power means or motor 15 drives the fluid means 17 so as to pump fluid in the direction of the arrow into the fluid drive circuit 175. In the event that the fluid motor malfunctions so as not to turn properly, then pressure built up in the fluid drive circuit is relieved through the pressure relief check valve 180. If, on the other hand, the fluid motor commences to "free-wheel," so as to cause a vacuum or reduced pressure area in either the fluid drive circuit 175 or the fluid return circuit 176, then the associated torque relief check valve 181 (or 204) will open, causing fluid from the reservoir to proceed into the valve and thus supply the system with fluid. It is noted that when the torque relief check valve of one of the two circuits 175 and 176 is called into play, the pressure relief check valve of the remaining circuit will co-act to remove an equivalent amount of fluid from the associated circuit and into the reservoir. The phantom lines E simply indicate that all of the check valves will be emersed in the hydraulic or lubricating fluid of the system.

The system of FIGURE 19 is identical to that of FIGURE 18 with the exception that the pressured lubricating line 207 and return line 211 are deleted, thus removing the necessity for including the second gear stage of the gear pump 17; likewise removed are the pressure relief and torque relief check valves 203 and 204 from the fluid return circuit 176' which corresponds to circuit 176 in FIGURE 18. Thus, the single-stage pump operation operates to supply fluid to the fluid motor 22 and also to withdraw, through force-feed, fluid to the outlet O in FIGURE 19. The check valves 180 and 181 again will be emersed in the reservoir fluid and will operate in the manner heretofore indicated in connection with FIGURE 18.

The optional system of FIGURE 20 is identical to that of FIGURE 18, with the exception that the pressure line 211 for lubricating the fluid motor is deleted.

FIGURE 22 illustrates an optional type of two stage pump which may be used in substitution for pump 17 in FIGURE 18 for example. Thus, a motor 200 including output shaft 201 may be provided, with the latter including an eccentric bore 202 receiving spacer 203. A universal bearing 204 is mounted within the bore 202 against spacer 203 and is locked in place by suitable means 205. The ball 206 of the bearing may interiorly receive at its central bore 207 a shaft 208. This shaft is preferably slidably disposed within the ball and is secured at its outer end 209 to double-acting piston 210. The latter operates in cylinder bore 211 of the pump block 212. Block 212 is provided with orifices 213–216 which communicate with ball check valves 217–220 in the manner indicated. Check valves 218 and 220 are system exhausts which returns fluid to the pump, whereas check valves 217 and 219 pump fluid to the systems concerned. Such a type of pump may be used as a pump 17 in FIGURES 18 and 20. The piston 210 is double-acting, since the same is eccentrically driven by shaft 201 through the ball and shaft combination 209.

FIGURES 23–25 illustrate various types of control valve and manifold combinations in connection with the cylinder block 30. Thus, in FIGURE 23 it is shown that in lieu of separate control valves 62 there may be provided mutually spaced control valve portions 62F in an annular, valve body ring 222 which is integral with the substitute cylinder block 30. In conjunction therewith, there may be utilized a circular manifold 223 having lower grooves 224 and 225 communicating with pressure and exhaust lines 226 and 227 in the manner heretofor indicated with reference to FIGURE 4.

FIGURE 24 illustrates that the control valve-containing ring, instead of being integral with the block, may be a separate ring suitably drilled to constitute the independent valves, e.g. 62, of the system.

FIGURE 25 illustrates an embodiment of the invention similar to FIGURE 4, but wherein a pair of manifold rings 228 and 229 are utilized, the former being provided with annular grooves 230 and 231 and the latter including mutually spaced apertures 232 and 233, in the manner as shown in FIGURE 4, for supplying the intake and exhaust ports of the valves 62 which are formed integrally with control valve ring 234.

FIGURE 26 illustrates a cylinder block 30 including the integrally formed control valves that are represented in FIGURE 23. In FIGURE 26 the cam 82' of FIGURE 6 is utilized, with the latter being journaled to the output shaft 25 by means of bearings 235, mounted in the manner illustrated. A gear 236 is pinned at 237 to the revolving cam 82', and the aforementioned gear is mechanically coupled to a corresponding bevel gear 238 which is pinned to shaft 239. This shaft is journaled within bearings 240 and 241 pressed into bearing housing 242. The latter is secured to the revised ring 29' in the housing structure. Shaft 239 is coupled to a power source 243 which may be a constant or variable-speed motor. The purpose of the embodiment illustrated in FIGURE 26 is to show that the cam 82' may be driven separately by an outside source other than keyed directly to the output shaft 25 of the fluid motor.

FIGURE 27–29 illustrate what is believed a novel and highly useful application of the present invention in the provision of nominally radially oriented power cylinders and cooperating piston rods which connect to a mother rod and crankshaft combination, to provide output power. In these figures the output shaft 246 takes the form of a crank having the usual integral plates 247 and 248 and main bearing 249. A bushing 250 cooperates with bearing 249 and is pressed into the bore 251 of mother rod 252. Rod 252 is secured to piston 253 in the usual manner. Piston 253 is operatively disposed within its cylinder 254, and the latter is pinned at its mounting ear 255 by a pin 256 to the housing 257 and housing plate 258 of the structure. The latter is bolted by means 259 to the housing 257 in the manner indicated. It will be understood that there will be a single mother rod 252. Remaining cylinders are designated as 254A, these include corresponding pistons 253A and piston rods 252A which are respectively pinned by their respective pins 260 to cooperating portions 261 of mother rod 252.

The cylinders 254A are journaled to the housing 257 and housing plate 258 in an identical manner as that hereinbefore described. The various fittings 262 are threaded into the cylinders 245 and 254A in the manner indicated and are coupled by flexible conduit 263–266 to conduit 267 and 268, this by the inclusion of a plurality of elbows 269. Tees 270 and 271 are set into the 267 and 268 lines to provide communication of these lines with control valve structure 272. This structure includes a base plate 273 and a housing ring 274 integrally affixed thereto. The control valves 62 are identical to those indicated in FIGURES 2–4 as is also the manifold structure at 64. Correspondingly, the cam 82 is, as before, pinned to output shaft 246 which corresponds to output shaft 25 in FIGURE 4. The manifold, control valve and cam structure have been heretofore described and such description need not be repeated. The structure at 272 may be bolted by bolts 276 in a conventional manner after the shaft journal bearing 277, journalling shaft 246, has been installed in a conventional manner as shown.

While the valves 62 in FIGURE 27 correspond with those identically numbered in FIGURE 4, it will be understood that, as seen in FIGURE 29, the same may take the form of an integral control valve ring. In any event, a suitable manifold such as the manifold ring 223 of FIGURE 23 will be utilized.

In operation the structure of FIGURES 27–29 serves in effect as a radial engine. A suitable pump and reservoir system is coupled to conduits 280 and 281 of the structure in FIGURE 27 to power the hydraulic pistons 253 and 253A. The operation of the piston 253 and its mother rod 252 is to rotate the output shaft 246. Such revolvement is aided by the remaining cylinders and their piston rods which pivotally connect to the mother rod in a conventional manner. The several pistons may be designed to be double-acting, as is the case in the embodiment in FIGURE 27, and the movement of the cylinders is accommodated by the flexible nature of conduit 263–266. Access and relief slots may be provided at S in FIGURE 27.

FIGURES 30 and 31 illustrate a central portion of a slightly modified fluid motor wherein two separate hydraulic or pneumatic systems are supplied, one to apply pressure to and receive exhaust from the pressure cylinders 34 in FIGURE 4, and the remaining system to control the disposition of control valve spools 285 (individually corresponding to valve gate 71 in FIGURE 3). The individual spools may have extremities 286 and 287 which operate as stop abutments cooperating with internal and external rings 288 and 289 in the housing structure. Except for this, the construction of the cylinder block, valve portions and manifold is substantially identical to that illustrated in FIGURES 23–25, with the exception that the manifold grooving is modified and cooperates with a rotating kidney valve plate 290.

In referring to FIGURE 31 it is seen that the rotating kidney valve plate 290 includes annular passageway slots 291 and 292 and two pairs of kidney-shaped slots, i.e. 293, 293′, 294 and 294′.

Passageway 295 interconnects groove 292 with kidney slots 293′. Correspondingly, passageway 296 supplies intercommunication between kidney slot 294′ and annular groove 291. In a similar manner passageway 297 provides communication between kidney slot 293 and annular groove 291. And passageway 298 supplies communication between annular groove 292 in kidney slot 294. The kidney slots illustrated are preferably approximately 150° in arcuate extent and are mutually opposite each other; thus, and assuming there are eight cylinders in the motor, three of the cylinders will be on pressure at any one particular time in the cycle, whereas the three opposite cylinders will be at exhaust condition. The annular rings 291 and 292 are simply manifold rings, with 291 being a pressure groove communicating through aligned passageways 300 to the pressure intake at 301. Correspondingly, aligned passageways 302 offer communication between annular groove 292 and exhaust 303.

It is seen that the manifold ring 304 is provided with a plurality of holes 305 and 306 and also a pair of annular grooves 307 and 308 on the underside thereof. Groove 308 communicates with aligned passageways 309 to exhaust 310 of the other fluid system, whereas groove 307 communicates via passageway means 311 to the pressure side 312.

The annular grooves 307 and 308 serve as manifold rings for system #1 which is a hydraulic or pneumatic system supplying pressure to and returning exhaust from the pressure cylinders 34. In contrast, the manifold grooves 291 and 292 of the rotating kidney valve supply hydraulic pressure for and return exhaust from the areas of the control valves approximate the outer ends of the valve spool 285. Thus, system #2 is a control system for controlling the movement back and forth of the various, mutually spaced, concentrically related spool valves, i.e. related to the axis of the output shaft 314.

As to make up of the remainder of the structure, the composite housing 315 includes the cylinder block 30A (correspondingly to cylinder block 30 in FIGURES 2 and 4), the outer housing 316 which corresponds with the outer housing of the structure in FIGURE 2, and also an upper end bell 317 which is bolted by bolts 318 to the remainder of the structure as illustrated in FIGURE 30. An oil seal 319 is mounted within bell 317 to seal the rotating shaft 314. A pressure plate 320 is keyed by key 321 to shaft 314 and is locked in place by set screw 322. A plurality of spring seats take the form of counter bore areas 323 and are mutually spaced about the lower surface of the pressure plate 320. Springs 324 are mounted therein and are also mounted at the opposite extremities to spring seats 325 of the rotating kidney valve plate 326. Pins 327 and the pin springs 328 serve as a loose intercoupling means between the pressure plates and the rotating kidney valve plate.

In operation, the structure of FIGURES 30 and 31 functions substantially the same as the structure of FIGURES 1–4 previously described. By virtue of the annular groove and kidney passageways in the kidney valve plate, which rotates in accordance with the rotation of shaft 314, there is an alternate powering of opposite extremities of the shuttle valves 285 in FIGURE 30 so that one of the valves admits pressure to the cylinder 32 (on the right) whereas the spool of an opposite control valve is translated in the opposite direction, so that fluid exhausted from the rising piston on the opposite side of the structure is caused to pass to the exhaust system. It is seen in FIGURE 31 that annular groove 292 and kidney passageway 293′ function with the exhaust, system #2, whereas the annular groove 291 and kidney passage 294′ function on the pressure side. This allows for the progressive positioning of the control valve shuttles 285 to their pressure, and subsequently to their exhaust conditions as the shaft 314 and kidney valve 290 continue their rotation.

Accordingly, what has been provided is a new type of transmission system incorporating a fluid motor output drive, and where it is seen that the cylinders of the fluid motor in such system may be either oriented in parallel or in mutually radial disposition from a common center. Various ramifications of the valving and allied features have been illustrated, but with the important concept present that there is a single control valve, control valve element, or control valve portion for each pressure cylinder and piston combination. The control valves as have been seen may be controlled electrically through a rotating switch and solenoids, may be controlled pneumatically or hydraulically, and such control may be taken directly from the output shaft or by an external source. Structure in FIGURES 27–29 is particularly useful since standard parts can be used to produce a high-torque radial engine, powered by a unique fluid motor having radially oriented cylinders, see FIGURE 27. And, whatever form the fluid motor may take, the same is ideally suited for the incorporation of the turning unit systems as indicated in FIGURES 18–20.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. In a turning unit system including, in combination, fluid pump means having input and output orifices, power means coupled to said pump means for driving said pump means, a fluid drive circuit having an input coupled to said output orifice of said pump means and also an output, a fluid return circuit having an outlet and an inlet, a fluid motor having an output shaft, a fluid input coupled to said output of said fluid drive circuit, and a fluid output coupled to said inlet of said fluid return circuit, and a reservoir serially connected between said inlet orifice of said fluid pump means and said outlet of said fluid return circuit; an improvement comprising a fluid-motor, torque-relief, check-type valve having an inlet communicating with said reservoir and an outlet communicating with said fluid drive circuit and selectively communicating with said valve inlet, for selectively admitting fluid from said reservoir directly into said fluid drive circuit when the output torque of said fluid motor output shaft exceeds that which would be produced solely through the normal operation of said system.

2. Structure according to claim 1 wherein said valve includes manually-operable adjustment screw means for presetting the threshold of valve opening of said valve.

3. In a turning unit system including, in combination, fluid pump means having input and output orifices, power means coupled to said pump means for driving said pump means, a fluid drive circuit having an input coupled to said output orifice of said pump means and also an output, a fluid return circuit having an outlet and an inlet, a fluid motor having an output shaft, a fluid input coupled to said output of said fluid drive circuit, and a fluid output coupled to said inlet of said fluid return circuit, and a reservoir serially connected between said inlet orifice of said fluid pump means and said outlet of said fluid return circuit; an improvement comprising a fluid-motor, torque-relief, check-type valve having an inlet communicating with said reservoir and an outlet communicating with said fluid drive circuit and selectively communicating with said valve inlet, for selectively admitting fluid from said reservoir directly into said fluid drive circuit when the output torque of said fluid motor output shaft exceeds that which would be produced solely through the normal operation of said system, and a pressure-relief check-type valve having an inlet communicating with said fluid drive circuit and an outlet communicating with said reservoir and selectively communicating with said pressure-relief valve inlet, for admitting fluid from said fluid drive circuit directly to said reservoir when the fluid pressure in said fluid drive circuit exceeds a desired maximum.

4. The structure of claim 3 wherein each of said valves includes a manually-operable, adjustment screw means for presetting the threshold of valve opening of each of said valves, respectively.

5. A transmission system having a closed, fluid-operating system and including, in combination, fluid pump means comprising an input, first pump and an output, second pump, each of said pumps having input and output orifices, power means for synchronously driving said pump means coupled thereto, a fluid drive circuit having an input coupled to said output orifice of said first pump and also an output, a fluid return circuit having an outlet coupled to said input orifice of said second pump and also an inlet, a fluid motor having a fluid input coupled to said output of said fluid drive circuit and also a fluid output coupled to said inlet of said fluid return circuit, and a reservoir serially connected to and between said input orifice of said first pump and said output orifice of said second pump, said first and second pumps being constructed and arranged for equivalent delivery and mutual, interior fluid-flow isolation.

6. A transmission system having a closed, fluid-operating system and including, in combination, fluid pump means comprising an input, first pump and an output, second pump, each of said pumps having input and output orifices, power means for synchronously driving said pump means coupled thereto, a fluid drive circuit having an input coupled to said output orifice of said first pump and also an output, a fluid return circuit having an outlet coupled to said input orifice of said second pump and also an inlet, a fluid motor having a fluid input coupled to said output of said fluid drive circuit and also a fluid output coupled to said inlet of said fluid return circuit, and a reservoir coupled to and between said input orifice of said first pump and said output orifice of said second pump, and wherein said system includes means for lubricating said fluid motor, said means being interposed between said reservoir and said output orifice of said second pump.

7. The system of claim 5 wherein said pump means comprises a stage pump having ganged, first and second stages, said stages constituting said first and second pumps, respectively.

8. The system of claim 5 wherein said pump means comprises a two-stage gear pump having ganged, first and second stages, said stages constituting said first and second pumps, respectively.

9. A transmission system having a closed, fluid-operating system and including, in combination, fluid pump means comprising an input, first pump and an output, second pump, each of said pumps having input and output orifices, power means for driving said pump means coupled thereto, a fluid drive circuit having an input coupled to said output orifice of said first pump and also an output, a fluid return circuit having an outlet coupled to said input orifice of said second pump and also an inlet, a fluid motor having a fluid input coupled to said output of said fluid drive circuit and also a fluid output coupled to said inlet of said fluid return circuit, and a reservoir serially connected to and between said input orifice of said first pump and said output orifice of said second pump, and wherein said fluid drive circuit includes a fluid-motor, torque-relief, check-type valve having an inlet communicating with said reservoir and an outlet communicating with said fluid drive circuit and selectively communicating with said valve inlet, for selectively admitting fluid from said reservoir directly into said fluid drive circuit when the output torque of said fluid motor output shaft exceeds that which would be produced solely through the normal operation of said system, and wherein said fluid return circuit includes a pressure-relief check-type valve having an inlet communicating with said fluid return circuit and an outlet communicating with said reservoir and selectively communicating with said pressure relief valve inlet, for admitting fluid from said fluid return circuit directly to said reservoir when the fluid pressure in said fluid return circuit exceeds a desired maximum.

10. A transmission system having a closed, fluid-operated system and including, in combination, fluid pump means comprising an input, first pump and an output, second pump, each of said pumps having input and output orifices, power means for driving said pump means coupled thereto, a fluid drive circuit having an input coupled to said output orifice of said first pump and also an output, a fluid return circuit having an outlet coupled to said input orifice of said second pump and also an inlet, a fluid motor having a fluid input coupled to said output of said fluid drive circuit and also a fluid output coupled to said inlet of said fluid return circuit, and a reservoir serially connected to and between said input orifice of said first pump and said output orifice of said second pump, and wherein said fluid drive circuit includes a fluid-motor, torque-relief, check-type valve having an inlet communicating with said reservoir and an outlet communicating with said fluid drive circuit and selectively communicating with said valve inlet, for selectively admitting fluid from said reservoir directly into said fluid drive circuit when the output torque of said fluid motor output shaft exceeds that which would be produced solely through the normal operation of said system, said fluid drive circuit also including a pressure-relief check-type valve having an inlet communicating with said fluid drive circuit and an outlet communicating with said reservoir and selectively communicating with said pressure-relief valve inlet, for admitting fluid from said fluid drive circuit directly to said reservoir when the fluid pressure in said fluid drive circuit exceeds a desired maximum; and wherein said fluid return circuit includes a fluid-motor, torque-relief, check-type valve having an inlet communicating with said reservoir and an outlet communicating with said fluid return circuit and selectively communicating with said valve inlet, for selectively admitting fluid from said reservoir directly into said fluid return circuit when the output torque of said fluid motor output shaft exceeds that which would be produced solely through the normal operation of said system, said fluid return circuit also including a pressure-relief check-type valve having an inlet communicating with said fluid return circuit and an outlet communicating with said reservoir and selectively communicating with said pressure relief valve inlet, for admitting fluid from said fluid return circuit directly to said reservoir when the fluid pressure in said fluid return circuit exceeds a desired maximum.

11. Structure according to claim 6 wherein said lubricating means includes a filter interposed between said fluid motor and said output orifice of said second pump.

12. Structure according to claim 10 wherein each of said valves includes a respective, manually-operable, adjustment screw means for presetting the threshold of valve opening of each of said valves, respectively.

13. A transmission system having a closed, fluid-operating system and including, in combination, fluid pump means comprising an input, first pump and an output, second pump, each of said pumps having input and output orifices, power means for driving said pump means coupled thereto, a fluid drive circuit having an input coupled to said output orifice of said first pump and also an output, a fluid return circuit having an outlet coupled to said input orifice of said second pump and also an inlet, a fluid motor having a fluid input coupled to said output of said fluid drive circuit and also a fluid output coupled to said inlet of said fluid return circuit, and a reservoir coupled to and between said input orifice of said first pump and said output orifice of said second pump, and wherein said system includes means for lubricating said fluid motor, said means being interposed between said reservoir and said output orifice of said second pump.

14. A transmission system including, in combination, fluid pump means comprising a first pump and a second pump, each of said pumps having first and second operating orifices, power means for synchronously driving said pump means coupled thereto, a first fluid circuit having a first extremity coupled to said second operating orifice of said first pump and a second extremity, a second fluid circuit having a first extremity coupled to said second operating orifice of said second pump and also a second extremity, a fluid motor having first and second operating orifices respectively coupled to said second extremities of said first and second fluid circuits, a reservoir operatively coupled between said first operating orifices of said first and second pumps, and adjustable valve means interposed between said first extremities of said first and second fluid circuits and said second operating orifices of said first and second pumps for selectively reversing the coupling of said first extremities of said first and second fluid circuits to said second operating orifices of said first and second pumps.

References Cited

UNITED STATES PATENTS

| 1,656,093 | 1/1928 | Baker | 60—53 XR |
| 2,225,631 | 12/1940 | Hawley | 60—53 XR |
| 2,582,556 | 1/1952 | Morey | 60—53 |
| 3,314,369 | 4/1967 | Yonei | 103—126 |

EDGAR W. GEOGHEGAN, *Primary Examiner.*

U.S. Cl. X.R.

103—126; 230—92; 239—265.23